Oct. 27, 1936.  A. KORBISSER  2,059,119
ANIMAL TRAP
Filed March 5, 1936   2 Sheets-Sheet 1

Inventor
Anton Korbisser

By Clarence A. O'Brien and
Hyman Berman  Attorney

Oct. 27, 1936.  A. KORBISSER  2,059,119
ANIMAL TRAP
Filed March 5, 1936  2 Sheets-Sheet 2
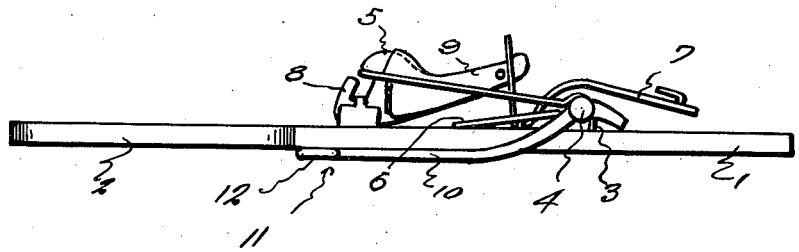
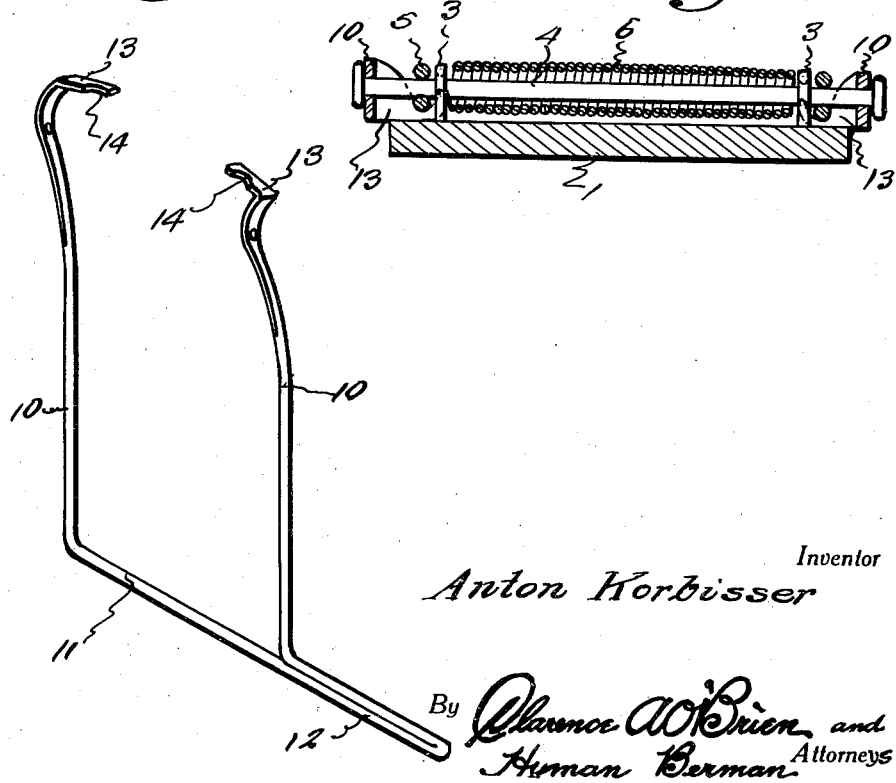
Inventor
Anton Korbisser Patented Oct. 27, 1936

2,059,119

UNITED STATES PATENT OFFICE 2,059,119

ANIMAL TRAP

Anton Korbisser, Edmonton, Alberta, Canada

Application March 5, 1936, Serial No. 67,384

4 Claims. (Cl. 43—83)

The present invention relates to new and useful improvements in animal traps of the general type of that constituting the subject matter of United States Patent No. 2,000,752, issued May 7, 1935, to H. R. Graybill.

A very important object of the invention is to provide, in a manner as hereinafter set forth, a trap of the aforementioned character embodying novel means through the medium of which a mouse, rat or other small animal which has been caught may be removed without the necessity of touching the jaw or animal with the hand.

Another very important object of the invention is to provide, in a trap of the character described, novel means for setting said trap without touching the jaw with the hand thereby promoting safety.

Still another very important object of the invention is to provide a trap embodying a manually operable jaw actuating lever, said lever being formed from a single length of suitable wire.

Other objects of the invention are to provide an animal trap of the character described which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 3 is a side elevational view, showing the trap after it has been set with the lever returned to inoperative position.

Figure 4 is a view in transverse section, taken substantially on the line 4—4 of Figure 1.

Figure 5 is a perspective view of the jaw operating lever.

Figure 1:
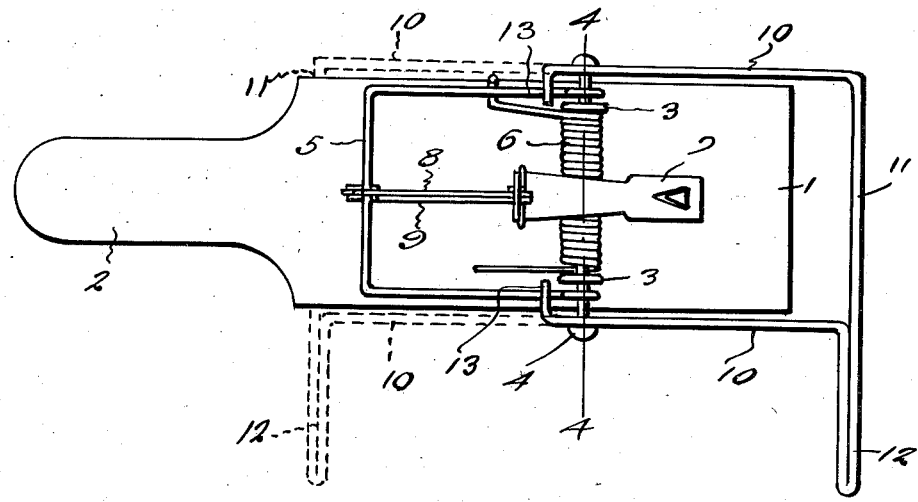
Figure 1 is a top plan view of a trap embodying the present invention, showing said trap just after the jaw has been set.

Referring now to the drawings in detail, it will be seen that the reference numeral 1 designates a base on one end of which is a handle 2. Secured transversely on the base 1 at an intermediate point by staples 3 is a rod 4 on which a substantially U-shaped jaw 5 is journaled. The jaw 5 is actuated in one direction by a spring 6 which encircles the rod 4. The reference numeral 7 designates a bait pedal which is secured in raised position by a locking bar 8 which also secures the jaw 5 in open or set position. A setting lever 9 is associated with the locking bar 8.

As illustrated to advantage in Figure 4 of the drawings, the rod 4 projects beyond the end portions of the jaw 5 and journaled on the end portions of said rod 4 are the legs 10 of a substantially U-shaped lever 11. The lever 11, it will be noted, is made from a single length of suitable wire formed to provide a laterally projecting operating handle 12. Projecting inwardly from the pivoted ends of the legs 10 are arms 13 which are engageable beneath the jaw 5. The arms 13 have formed therein notches 14 for the reception of the jaw 5.

Figure 2:
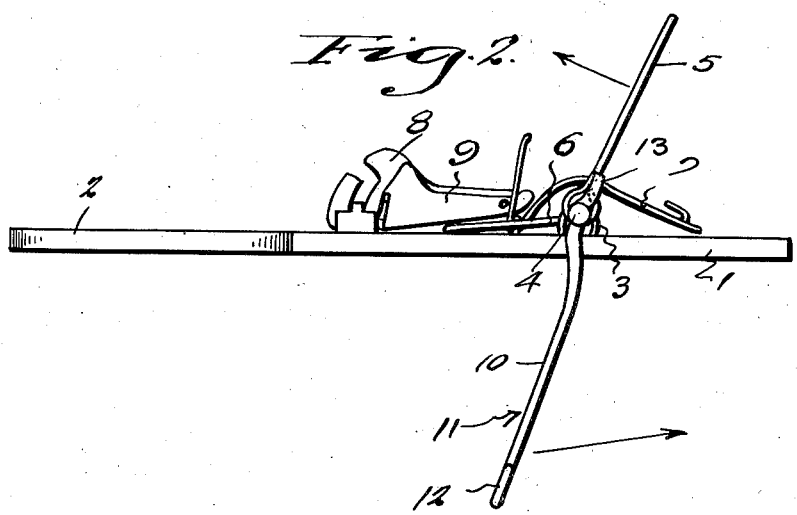
Figure 2 is a view in side elevation, showing the trap being set.

When the trap has been set the lever 11 is in the position shown in dotted lines in Figure 1 of the drawings. When the trap has been sprung or closed and an animal has been caught therein, said animal may be released by swinging the lever 11 downwardly and forwardly in a manner to raise the jaw 5 to substantially the position shown in Figure 2 of the drawings. To set the trap again movement of the lever 11 is continued in a manner to swing the jaw 5 rearwardly against the tension of the spring 6 until said jaw engages and is secured to the locking bar 8. The lever 11 is then returned to the position shown in dotted lines in Figure 1 of the drawings and the trap is again ready for operation. Of course, handling of the trap is facilitated by the handle 2 on one end of the base 1.

It is believed that the many advantages of a trap constructed in accordance with the present invention will be readily understood, and although a preferred embodiment is as illustrated and described, it is to be understood that changes in the details of construction may be resorted to which will fall within the scope of the invention as claimed.

What is claimed is:—

1. A trap comprising a base, a substantially U-shaped jaw mounted for swinging movement on one side of said base, a spring for actuating said jaw toward closed position, a substantially U-shaped lever pivotally mounted on the base and operable on the opposite side thereof, and means on the ends of said lever engageable with the jaw for actuating said jaw against the tension of the spring.

2. A trap comprising a base, a rod mounted transversely on the base at an intermediate point, a substantially U-shaped jaw journaled on said rod, a spring for actuating said jaw toward closed position, and a substantially U-shaped lever journaled on the rod and engageable, at its ends, with the jaw for actuating said jaw against the tension of the spring.

3. A trap comprising a base, a substantially U-shaped jaw pivotally mounted on said base, a spring for actuating said jaw toward closed position, and a substantially U-shaped lever pivotally mounted on the base and engageable with the jaw for actuating said jaw against the tension of the spring, said lever being formed from a single length of material and including a laterally projecting handle at an intermediate point, said lever further including inturned arms on its ends engageable with the jaw.

4. A trap comprising a base, a rod mounted transversely on said base, a substantially U-shaped jaw journaled on said rod, a spring for actuating said jaw toward closed position, and a substantially U-shaped lever journaled on the rod and operable on the opposite side of the base from the jaw, said lever including arms on its ends engageable with the jaw, said lever constituting means for actuating the jaw against the tension of the spring.

ANTON KORBISSER.